United States Patent
Clark

[15] 3,691,545

[45] Sept. 12, 1972

[54] DIRECT DATA STORAGE SYSTEM FOR SCINTILLATION CAMERA

[72] Inventor: Gene E. Clark, Arlington Heights, Ill.

[73] Assignee: Nuclear-Chicago Corporation, Des Plaines, Ill.

[22] Filed: June 23, 1969

[21] Appl. No.: 835,671

[52] U.S. Cl. ......................340/174.1 G, 340/174.1 H

[51] Int. Cl. ................................................G11b 5/02

[58] Field of Search .340/174.1 G, 174.1 H, 174.1 A, 340/172.5, 347; 179/100.2 T; 178/6.6

[56] References Cited

UNITED STATES PATENTS 3,483,530 12/1969 Damron..............340/174.1 H

*Primary Examiner*—Stanley M. Urynowicz, Jr.
*Assistant Examiner*—Vincent P. Canney
*Attorney*—Lowell C. Bergstedt, Walter C. Ramm and Helmuth A. Wegner

[57] ABSTRACT

System for storing coordinate signals from Anger-type scintillation camera on magnetic tape in a video tape recorder system. An ADC circuit digitizes the coordinate signals and a buffer register stores the digitized signals as a binary digital word. The randomly occurring words are written on the video tape as they occur by transferring each word into a shift register and producing a start data pulse followed by a series of PSK waveforms representing the bits of the word. A parity bit and a series of synchronizing bits are produced until the next data word appears. The data words are recovered in the sequence and timing of their occurrence by replaying the video tape into a simple synchronized demodulation apparatus.

13 Claims, 7 Drawing Figures

INVENTOR
Gene E. Clark
BY Lowell C. Bergstedt ATTORNEY

INVENTOR
Gene E. Clark
BY Lowell C. Bergstedt ATTORNEY

INVENTOR
Gene E. Clark

BY Lowell C. Bergstedt ATTORNEY

DIRECT DATA STORAGE SYSTEM FOR SCINTILLATION CAMERA

Scintillation cameras are in widespread use in a large number of nuclear medicine departments of hospitals throughout the world. The most widely used scintillation camera is a commercial version of the Anger-type scintillation camera described in U. S. Pat. No. 3,011,057 and in the many articles published on this device within the last 10 years. The scintillation camera is able to take a "picture" of the distribution of radioactivity throughout an object under investigation, such as an organ of the human body which has taken up a diagnostic quantity of a radio-active isotope. A scintillation camera of the Anger-type produces a picture of the radioactivity distribution by detecting individual gamma rays emitted from the object and passing through a collimator to produce a scintillation in a thin planar scintillation crystal. The scintillation is viewed by a bank of photomultiplier tubes, and appropriate electronic circuits translate the outputs of the photomultiplier tubes into $x$ and $y$ coordinate signals and a Z signal which indicates generally the energy of the scintillation event or whether it falls within a selected energy window. A picture of the radioactivity distribution in the object may be obtained by coupling the $x$, $y$ and Z signals to a cathode ray oscilloscope (where the individual scintillation events are displayed as small spots of light positioned in accordance with the coordinate signals) and integrating a large number of spots on photographic film. A relatively large number of scintillation events is required to make up a final picture of the radioactivity distribution, and the picture obtained in this manner is basically a qualitative display of the data from the scintillation camera. Individual scintillation events become integrated into the total picture and the overall accumulation of data in this type of readout provides no possibility of determining the number of events occurring within a particular period of time at a particular location in the object under study. In other words, with this picture, the individual scintillation events may not be reconstructed in their respective time sequences to permit any analysis on a dynamic, quantitative, or region of interest basis.

Therefore, it has long been recognized that it would be desirable to be able to store the individual scintillation events directly on a real time basis so that essentially all of the data obtained by the scintillation camera during a particular diagnostic procedure or study would be available to be recovered at any time after the study has been completed. Such direct recording of all of the data would prevent loss of the information if something should go wrong in the picture taking process and also provides important flexibility in quantitating on a time or region of interest basis the data produced during the diagnostic procedure. Direct data recording is particularly useful when the radioactivity distribution within the organ is desired to be imaged in a dynamic sense, such as when a bolus of radioactivity is to be traced through the heart or various blood vessels of the brain and other organs. Direct data recording in these situations enables the playback of the data in real time for segregating various phases of the dynamic activity and for correlating various sequences of the dynamic activity.

A variety of approaches to direct data recording of scintillation camera output data have been attempted in the past. Some of the techniques used have been successful, but have involved expensive sophisticated equipment which would be difficult for the average user to work with. Others have taken rather simple approaches which have not always been adequate in terms of the ability to store randomly occuring data at relative high count rates. The loss of a large fraction of the available data, particularly when recording dynamic activity, is highly undesirable.

Therefore, it is the object of this invention to provide apparatus for high speed, real time recording of randomly occuring data which is relatively simple and inexpensive.

It is another object of this invention to provide a relatively simple and inexpensive phase shift keyed modulator circuit.

It is another object of this invention to provide a relatively simple and inexpensive phase shift keyed demodulator circuit.

The direct data storage system of this invention features the recording of randomly occurring digital data words on a video tape recorder in the form of a start pulse followed by a number of phase shift keyed (PSK) data bits according to the content of the data word. A video tape recorder is a relatively inexpensive recording means, and a helical scan recorder with a three MHz bandwidth (commercially available) is sufficient for the recording of PSK data bits at a 2 — 3 MHz rate. When used in connection with a scintillation camera of the Anger type, the $x$ and $y$ analog signals from the scintillation camera are converted to digital form in some type of analog-to-digital conversion (ADC) circuitry and stored in a buffer register. The number of binary digits or bits representing each of the coordinate signals may be selected to give the desired degree of accuracy in the conversion process. For example, in the preferred embodiment eight bits have been selected to represent each of the $x$ and $y$ coordinate signals from the scintillation camera so that the X and Y axes of the detector are each divided into $2^8$ or 256 data points. A greater or lesser number of bits would divide the axes into greater or lesser numbers of data points. If it is desired to record dual isotope studies, an additional bit may be added to the ADC-buffer register capacity to provide an indication of which isotope is represented by the digitized coordinate signal. The contents of the buffer register may be supplied to a digital-to-analog conversion (DAC) circuit to recover the analog form of the $x$ and $y$ coordinate signals for display on an oscilloscope, with the unblanking signal for the oscilloscope provided after the ADC process has been completed so that the output of the DAC accurately reflects the input analog $x$ and $y$ pulses.

The data word in the buffer register, representing the $x$ and $y$ coordinate signal together with an isotope bit if desired, may also be used as an input to a core memory system of a computer or multichannel analyzer or as an input to modulation apparatus for recording the data word in sequence with other data words on video tape. To record on video tape, the data word in the buffer register is first transferred in parallel into a shift register having the same bit capacity and then shifted serially out of the shift register into PSK (phase shift keyed)

modulation apparatus. The transfer into the shift register is initiated by a "transfer in" signal from a control circuit after the ADC has completed its task; and in response to a transfer in signal, a start pulse is generated and fed to the video tape recorder. Shifting the data out of the shift register is inhibited during the start pulse, but thereafter data bits are shifted out of the register by clock pulses derived from a sinusoidal oscillator, and 17 PSK data bits are generated by the modulation apparatus and sent to the video tape recorder. Modulation is performed by gating single cycles of the sinusoidal waveform from the oscillator onto one of a pair of output leads in accordance with the content of the data bit arriving at the modulator input. The signals on one of the output leads from the modulation apparatus go through an inversion so that the final waveform sent to the video tape recorder comprises positive and negative single cycles of the oscillator waveform, and this is the PSK form of the input data bits. The modulation process is synchronized by the oscillator and clock signals derived from the oscillator so that data bits are presented at the input of the modulator at the time the oscillator waveform beings a cycle.

A parity bit generator may also be included to produce a parity bit depending on the content of the data word. The outputs of the shift register and the parity generator may be gated into the PSK modulation apparatus under the control of a scaler-gating circuit which permits the first 17 clock pulses to present the 17 data bits from the shift register to the modulation apparatus and then present the parity bit as an 18th bit. The scaler-gating arrangement may also provide for continuous gating of the parity bit into the PSK modulator during the period between data words so that 1's or 0's will be continuously written on the video tape between data words. As will be seen later, the writing of 1's or 0's following the data word provides for continuous synchronization of the demodulation circuitry upon replay of the tape to recover the data. Vertical sync. pulses may be written on the tape, typically at a 60 cycle per second rate, to maintain synchronous operation of the video tape recorder. The start pulse initiating the beginning of a data encoding cycle resets the scaler-gating arrangement and the parity generator to prepare them for the next data word encoding sequence. Vertical sync. pulses occurring during the encoding of a data word will break up the encoding process, and that data word will probably be incorrectly recorded. As will be seen later, provision is made in the demodulator circuitry for throwing away such improperly recorded data.

A 100 MHz ADC sequentially processing the $x$ and $y$ signals from a scintillation camera will produce a system dead-time of approximately 10 microseconds so that the data modulation circuitry operating at a 2.5 MHz writing rate can easily keep up with the ADC. It should be understood that the ADC may be operating to produce and store a data word in the buffer register during the time that the modulation circuitry is encoding a previous data word which has been transferred to the shift register so that both operations may be proceeding simultaneously.

Upon replay of the video tape the data word thereon is recovered in binary digital form by detecting a start pulse and thereafter demodulating the sequence of PSK data bits. In accordance with this invention, demodulation is provided by an effective but simple and inexpensive PSK demodulator circuit. The PSK waveform recovered from the video tape recorder is typically distorted to some extent, particularly at points where the PSK waveform reflects a shift between 0 and 1 bits with a sharp change of direction of the waveform. The demodulator of this invention functions, in general, by sampling the recovered waveform when each PSK data bit is at substantially its 270° point. This is accomplished by generating strobe pulses at the 270° points and sampling the inverted output of a polarity sensing amplifier receiving the recovered waveform to register a 0 data bit when a negative polarity coincides with a strobe pulse and a 1 bit when a positive polarity coincides with a strobe pulse. The strobe pulses are basically generated by the combination of a free-running multivibrator, *a* 2 circuit, and a delay and shaping circuit. The free-running multivibrator circuit is synchronized by the output of a sync pulse generator which produces a sync pulse at each instance when the polarity sensing circuit output changes state. The free-running multivibrator is set to have a frequency substantially equal to twice the frequency of the oscillator used for producing the PSK data waveform. Because of the nature of the PSK data waveform (assuming proper recording and playback), sync pulses will be generated at least once for every two output pulses from the multivibrator. The 2 circuit is reset by the output of a start pulse decoder so that the next pulse presented to the delay circuit at the output of the 2 circuit corresponds to the 180° point of the first data bit, and the timing of this pulse is certain to be synchronized because the PSK waveform always changes polarity at the 180° point. The delay and shaping circuit delays the pulse from the 2 circuit for a period substantially equal to the time required for the PSK waveform to pass from the 180° to the 270° point. The 270° point is used as the sampling point because at this point the PSK waveform has just passed through a smooth polarity transition and the reproduction of the waveform from the video tape recorder is most likely to be correct at that time. In other words, the polarity of the PSK waveform is most likely to be correct at the 270° point, and thus sampling of the polarity at that point is most likely to result in a proper indication of the value of the data bit.

In accordance with this invention, the same shift register used for modulation may be used for demodulation. The output of the polarity sensing circuit is inverted for presentation to the serial input terminal of the shift register and the strobe pulses produce shifting of the register so that proper 1's and 0's of the data waveform will be inserted in accordance with the demodulation scheme outlined above. The overall demodulation circuitry may also include a parity checking arrangement if a parity bit is transmitted, and the demodulation may be performed under the control of a scaler-gating arrangement which gates 17 strobe pulses into the shift register to decode the PSK modulated waveform and at the 18th pulse produces a transfer-out signal to the shift register provided the parity checking circuit gives an indication that the data content of the shift register satisfies the parity condition indicated by the transmitted parity bit. The demodulator apparatus may also include a data break detector which will function to inhibit the production of a transfer-out signal upon the occurrence of the eighteenth strobe pulse if a break in the transmitted PSK waveform has occurred. Such a data break is signalled when a sync pulse from the sync pulse generator fails to occur at least once for every two output pulses from the multivibrator. Thus, the data break detector will prevent the utilization of a demodulated data word which represents an improperly recovered PSK waveform. At this point it should be noted that the sync bits recorded between data words maintain the synchronous operation of the free-running multivibrator.

From the above general description of the direct data storage system of this invention, it should be apparent that a relatively simple and inexpensive, but nevertheless efficient data storage system, is provided and that the modulator and demodulator of the data system are particularly simple and inexpensive. The system described is capable of high speed recording and playback of randomly occuring digital words which may be derived from an analog-to-digital conversion of scintillation camera output signals or from any other source. The digital data is written on the video tape as it occurs in real time and is accurately recorded on the video tape except when a vertical sync pulse intervenes. Other objects, features and advantages of this invention will become apparent from a consideration of the following detailed description in conjunction with the accompanying drawings in which:

Figure 1:
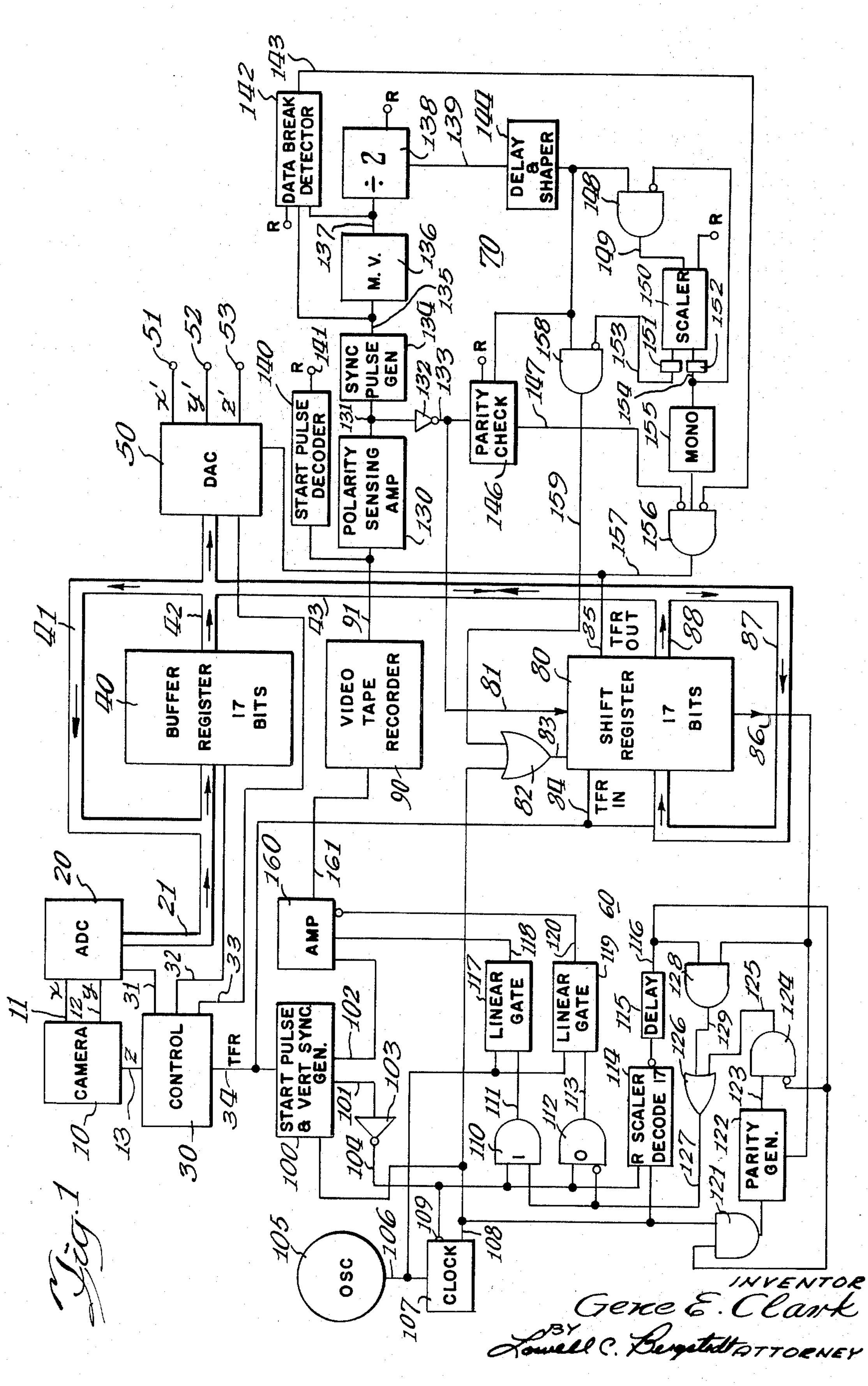
FIG. 1 is a block schematic diagram of a direct data storage system in accordance with this invention.

Referring now to FIG. 1, scintillation camera 10 is shown with *x* and *y* coordinate signal outputs on leads 11 and 12 coupled into an ADC circuit 20 and a Z output signal on lead 13 coupled into a control circuit 30. Control circuit 30 has various output leads 31, 32 and 33 coupling it to ADC circuit 20, buffer register circuit 40 and DAC circuit 50 to signify various control functions and information communication between these various circuits. ADC circuit 20 is coupled by way of a multiple conductor data bus 21 into buffer register 40. Buffer register 40 is coupled by way of an output data bus 42 into DAC circuit 50 and by way of a two-way data bus 43 to an input data bus 87 of shift register 80. Shift register 80 has an output data bus 88 coupled by way of two-directional data bus 43 to an input data bus 41 on buffer register 40. With these connections information is transferable in parallel from ADC circuit 20 into buffer register 40 and from thence into DAC circuit 50 or into shift register circuit 80. The contents of shift register circuit 80 may be transferred in parallel into buffer register 40. The two-way communication via data bus 43 avoids separate data busses linking the inputs and outputs respectively of buffer register 40 and shift register 80.

Control circuit 30 is also coupled by way of a transfer lead 34 to a transfer-in lead 84 associated with shift register 80 and to a start pulse and vertical sync generator 100. Start pulse and vertical sync generator 100 is coupled via output lead 102 to a combining amplifier 160 and via a second output lead 101 through inverting amplifier 103 to an inhibit and reset lead 104 which feeds an inhibit input 109 on clock circuit 107 and serves as an input to AND-GATES 110 and 112 and also as a reset input to scaler-decode 17 circuit 114 and parity generator 122.

Oscillator 105 is coupled to clock circuit 107 and linear gates 117 and 119. Output lead 108 from clock circuit 107 feeds through OR-GATE 82 to shift input lead 83 associated with shift register 80, and also feeds scaler-decode 17 circuit 114 and parity generator 122 through AND-GATE 121.

Shift register 80 has a serial data output lead 86 which feeds parity generator 122 and serves as an input to AND-GATE 128. Output 129 from AND-GATE 128 serve as one input to OR-GATE 126, and output 127 from OR-GATE 126 feeds an inverted input on AND-GATE 112 and a direct input on AND-GATE 110.

Scaler-decode 17 circuit 114 has an inverted output fed through delay circuit 115 as one input to AND-GATE 128, as an inverted input to AND-GATE 124 and a direct input to AND-GATE 121. Output 123 from parity generator 122 serves as an input to AND-GATE 124, and output 125 from AND-GATE 124 serves as an input to OR-GATE 126.

Output 111 from AND-GATE 110 serves as a switching input to linear gate 117, and output 113 from AND-GATE 112 serves as a switching input to linear gate 119. Output 118 from linear gate 117 provides a direct input to combining amplifier 160 and output 120 from linear gate 119 provides an inverted input to combining amplifier 160. The output 161 from combining amplifier 160 provides an input to video tape recorder 90.

Output 91 from video tape recorder 90 provides an input to polarity sensing amplifier 130 and start pulse decoder 140. A reset output 141 from start pulse decoder 140 feeds a reset terminal on data break detector 142, 2 circuit 138, parity check circuit 146 and scaler 150. Output 131 from polarity sensing amplifier 130 feeds sync pulse generator 134 and inverting amplifier 132. Output 133 from inverting amplifier 132 feeds serial input lead 81 associated with shift register 80 and parity check circuit 146.

Output 135 from sync pulse generator 134 serves as an input to free-running multivibrator circuit 136 and data break detector 142. Output 137 from free-running multivibrator 136 serves as an input to 2 circuit 138 and data break detector 142. Output 139 from 2 circuit 138 provides an input to delay and shaper circuit 144, and output 145 from delay and shaper circuit 144 provides an input to parity check circuit 146, AND-GATE 158, and AND-GATE 148. Output 143 from data break detector 142 provides an inverting input to AND-GATE 156. Output 149 from AND-GATE 148 feeds scaler circuit 150. Block 151 at the output of scaler 150 is a decode 17 circuit whose output 153 serves as an inverted input to AND-GATE 158. Block 152 at the output of scaler 150 is a decode 18 circuit whose output 154 feeds an inverted input on AND-GATE 148 and a monostable multivibrator 155.

Output 147 from parity check circuit 146 feeds an inverted input on AND-GATE 156 and the output from monostable multivibrator 155 feeds a third direct input to AND-GATE 156. Output 157 from AND-GATE 156 is coupled to a transfer-out lead 85 associated with shift register 80 and provides an input to DAC circuit 50.

Camera 10 is preferably an Anger-type scintillation camera so that the *x* and *y* output signals on leads 11 and 12 represent scintillation position coordinates. ADC circuit 20 functions to convert position coordinate signals on leads 11 and 12 under the control of control circuit 30 into a pair of digital words which are coupled into buffer register 40 via input bus 21. The ADC process may be accomplished by a single analog-to-digital converter with multiplexing of the *x* and *y* coordinate signals or by a pair of ADC circuits fed individually by the *x* and *y* coordinate signals. With either system, buffer register 40 will store both *x* and *y* information as a single data word and may also store an isotope bit for dual isotope operation. In this embodiment, buffer register 40 has a 17 bit capacity to provide for eight bits each for *x* and *y* and one bit for isotope indication. Typically, DAC circuit 50, which may be a multiplexed single DAC or a dual DAC, will provide continuously on output terminals 51 and 52 an analog indication of the contents of the *x y* sections of buffer register 40, but an output on output terminal 53 will occur only when a display of the contents of buffer register 40 is appropriate as related to an event initially converted by ADC 20 or an event recovered by demodulation from video tape recorder 90.

When a completed event in digital form has been entered into buffer register 40, control circuit 30 transmits a transfer command over lead 34 to shift register 80 and start pulse and vertical sync pulse generator circuit 100. Shift register 80 responds to the transfer command by accepting and storing the data word from buffer register 40. Start pulse and vertical sync generator 100 responds to the transfer command by producing a start pulse on lead 102 during the next succeeding clock interval and by providing a reset and inhibit signal on lead 101. This signal on lead 101, after inversion by amplifier 103, inhibits clock 107, resets scaler-decode-17 circuit 117 and parity generator 122 and shuts off AND-GATES 110 and 112 so that linear gates 117 and 119 will both be off during the start pulse and no waveforms will be presented on leads 118 and 120 to combining amplifier 160. Combining amplifier 160 will send the start pulse on lead 102 into video tape recorder 90. At the end of the start pulse the signal on lead 101 returns to 0 and clock pulses from clock circuit 107 which is driven by oscillator 105 will be sent to OR-GATE 82, parity generator 122, and scaler-decode-17 circuit 114. During the next 17 clock pulses, shift register 80 will shift seventeen times, scaler-decode-17 circuit 114 will count to 17 and then turn itself off until reset, and parity generator 122 will respond to data bits shifted out of shift register 80 serially onto lead 86. The 17 data bits coming sequentially out of shift register 80 will be coupled through AND-GATE 128 and OR-GATE 126 onto modulation input lead 127. This will happen during the next 17 clock pulses because AND-GATE 128 receives a true or 1 input from scaler-decode-17 circuit 114 until the end of the seventeenth clock pulse interval. In other words, scaler-decode-17 circuit counts 17 clock pulses and its inhibited output becomes false or 0 on the 17th clock pulse which is delayed in delay circuit 115 so that AND-GATE 128 is turned off at the end of the 17th clock pulse interval. Correspondingly, AND-GATE 121 is turned off so that no further clock pulses are coupled into parity generator 122, but AND-GATE 124 is turned on at the end of the 17th clock interval. Thus, the output on output lead 129 from AND-GATE 128 during the 17 clock intervals following a start pulse will reflect exactly the values of the successive data bits received from shift register 80. These data bits coupled through OR-GATE 136 onto modulation input lead 127 will control operation of AND-GATES 110 and 112. 1 value bits will turn on AND-GATE 110 and 0 value bits will turn on AND-GATE 112. In turn, AND-GATE 110 will turn on linear gate 117 in response to 1 bits so that a single cycle of the sinusoidal waveform from oscillator 105 will be produced on output lead 118. A 0 bit turning on AND-GATE 112 will, in turn, turn on linear gate 119 to couple one cycle of the sinusoidal waveform from oscillator 105 onto output lead 120. Thus, under the control of data bits shifted out of shift register 80, a sequence of waveforms will be produced on one or the other of leads 118 and 120. Just prior to the 18th clock interval, parity generator 122 will have determined a parity bit which will be transmitted during the 18th interval through AND-GATE 124 and OR-GATE 126 onto modulation input lead 127. If the parity bit is 0, a single cycle will be written on lead 120, and if the parity bit is 1, a single cycle will be written on lead 118. Then, if another start pulse is not immediately generated, the parity bit from parity generator 122 will continue to be provided on modulation input lead 127, and a string of cycles of the sinusoidal waveform will be produced on lead 120 or 118 depending on the value of the parity bit. In other words, a continuous series of 1's or 0's will be provided to the modulator after the 17 data bits have been encoded. The final PSK waveform will be produced on output lead 90 from combining amplifier 160 because the signals on output lead 120 from linear gate 119 are inverted.

At this point it should be apparent that, if it were desired not to produce a parity bit, the parity generator could be eliminated and a continuous string of 0's would be written after the 17 data bits are shifted out of the shift register 80. Also, it could be provided that the 19th clock pulse following a start pulse reset the parity generator so that, instead of writing synchronizing bits in accordance with the parity bit, a string of 0 bits would always be written for synchronizing purposes.

A typical waveform on lead 161 is thus a start pulse which may be a positive or negative voltage pulse having an amplitude greater than the maximum amplitude of the sinusoidal waveform forming the PSK bits, followed by a unique sequence of 17 positive and negative cycles of the sinusoidal waveform in accordance with the content of the encoded data word followed by a positive or negative cycle of the waveform representing the parity bit and a sequence of the same cycle until another start pulse is generated. This input to the video tape recorder is recorded in a known fashion on the magnetic tape and the resulting record is a real time record of the scintillations detected by the camera. Of course, it should be understood that, if the scintillations are occurring at a rate which cannot be handled quickly enough by the ADC circuit, a certain amount of data from the camera will be lost during busy intervals of the ADC. However, with a 10 microsecond dead-time in the ADC data at count rates of 100,000 counts per second can be adequately converted and stored without a harmful loss of data.

Figure 2:
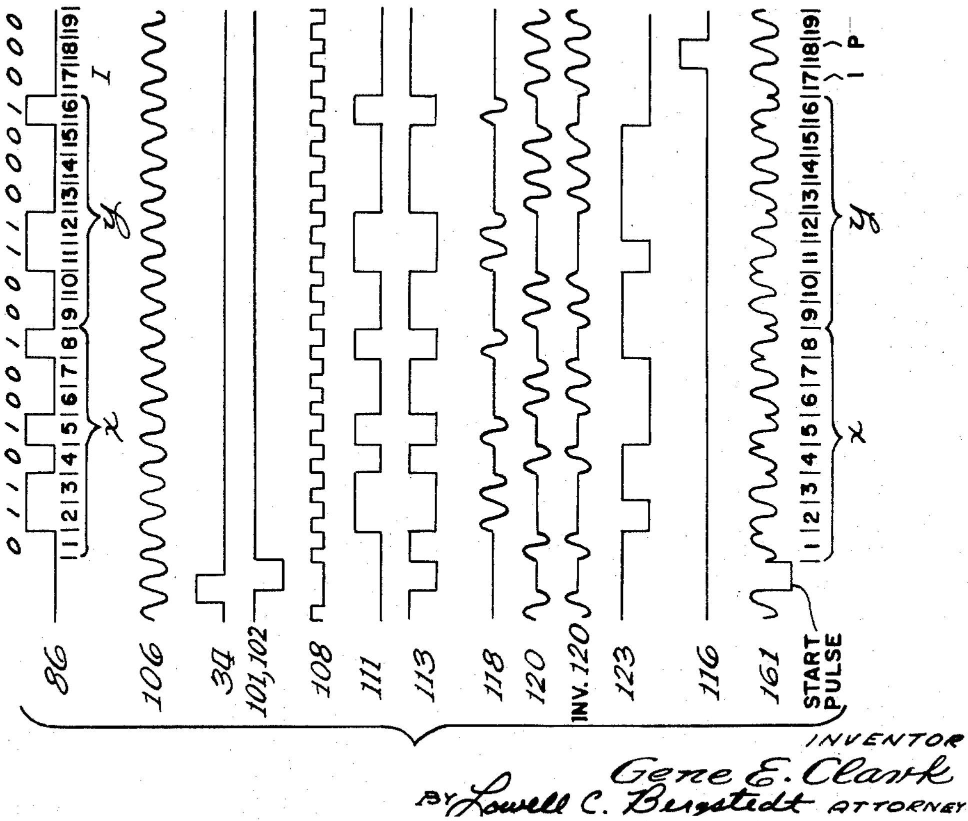
FIG. 2 is a waveform diagram illustrating the operation of the modulation section of the data storage system.

Referring now to FIG. 2 in conjunction with FIG. 1, the operation of the modulation apparatus to encode a typical data word is illustrated. The waveform 86 represents the data bits shifted out of shift register 80 in serial form. In other words, the bits are shifted out in the sequence 0, 1, 1, 0, 1, 0, 0, 1, etc. under the control of the cock pulses on lead 108 which are derived from the sinusoidal waveforms on lead 106. The encoding is initiated by the transfer command on lead 34 which produces the initial start pulse on lead 102 and the reset and inhibit signal on lead 101. The start pulse on lead 102 shows up first on output lead 131 and clock pulses are inhibited during the start pulse interval as shown in the waveform designated 108. Moreover, both AND-GATES 110 and 112 are shut off during the start pulse interval so no sinusoidal signals appear on either of leads 118 and 120. The first clock pulse following the start pulse shifts the first data bit which is a 0 onto modulation input lead 127 which turns on AND-GATE 112 and turns off AND-GATE 110. The waveforms 111 and 113 are the signals on the output leads 111 and 113 from AND-GATES 110 and 112 respectively. With AND-GATE 112 on, a 1 output exists on lead 113 during the first clock interval after the start pulse so a single cycle of the sinusoidal waveform is gated through linear gate 119 onto lead 120. An inverted form of the single cycle sinusoidal waveform appears on lead 161. The next two data bits are 1's so lead 111 has a 1 signal on it to produce two successive single cycles of the sinusoidal waveform on lead 118 and correspondingly two successive positive cycles of the waveform on output lead 161. This process continues for seventeen clock intervals. The output on lead 123 from parity generator 122 varies between 0 and 1 as the data word input builds up, but at the end of the 17th clock interval parity generator 122 has counted an odd number of 1 inputs, namely seven in this case, and thus generates a 0 output for transmittal to modulation input lead 127. The 18th encoded bit thus becomes a negative cycle of the sinusoidal waveform, and this negative cycle continues until another start pulse to provide synchronizing bits. The shift from encoding data bits to encoding the parity bit is seen as the output on lead 116 from scaler-decode-17 circuit 114 becomes negative after the end of the 17th clock interval, prohibiting further signals from shift register 80 from passing to the modulation input lead 127 and permitting signals from parity generator 122 to pass thereto. If an even number of 1 value data bits had been counted by parity generator 122, it would provide a 1 output which would be encoded as a positive cycle of the sinusoidal waveform and the following sequence of synchronizing bits would be positive cycles as well. It will be seen here that the encoding process is synchronous since the beginning of the positive half cycle of the sinusoidal waveform initiates the cock pulse interval which, in turn, produces the shifting of a data bit or a parity or synchronizing bit to the modulation input lead. Thus, one of the linear gates 117 and 119, depending on the value of the presented bit, will be turned on as the positive half cycle of the sinusoidal waveform beings.

Referring back again to FIG. 1, the output 91 from video tape recorder 90 is fed to a start pulse decoder 140 and polarity sensing amplifier 130. When the information stored on video tape is being played back into the demodulation section the waveform on lead 91 is typically a start pulse followed by a sequence of PSK waveforms representing the encoded data word. Because of the lack of complete fidelity in recording and playback, the waveform on lead 91 will be at least slightly distorted, but the character of the PSK waveform will be discernable. In particular, at the points where a transition is made between a 0 and 1 form of the PSK waveform the signal drops to 0 and then sharply reverses direction, the recovered form on lead 91 will probably not include the sharp drop to 0 and back again. If the waveform is approaching a 0 from the positive polarity and goes to 0 and then positive again in the encoded waveform, the recovered waveform will typically stay positive during that whole interval. There will, however, be a 0 crossing at substantially the midpoint or 180° point of each PSK form of a data word. Moreover, there is a high probability that, in the recovered waveform on lead 99, the polarity of the signal at the 270° point of the PSK form of a data bit will be correct. Thus, for a 0 bit, the 270° point will be positive and for a 1 bit, the 270° point will be negative. Start pulse decoder 140 produces a reset pulse on terminal 141 each time a start pulse is received. Typically, a start pulse decoder may be any form of circuit which detects the large negative amplitude of the start pulse but is not triggered by the lesser negative amplitudes of the PSK waveform. The reset pulse produced by the start pulse decoder resets data break detector 142, 2 circuit 138, parity check circuit 146 and scaler 150. Free-running multivibrator 136 runs continuously, but will be brought into synchronization at the first 0 crossing of the PSK waveform following the reset pulse which will take place at the 0° or 180° point of the first PSK bit. Thus, at least the second output pulse from the multivibrator 136 following a reset pulse will be synchronized no matter what the value of first data bit. Following the reset pulse, the first pulse out of the 2 circuit 138 will correspond to the 180° point at which the PSK waveform makes a smooth transition in polarity. This will also be true for each successive output from 2 circuit 138. In other words, after the 2 circuit is reset by the pulse from the start decoder, it will produce output pulses at the 180° point of each of the PSK encoded bits in the recovered waveform on lead 91. Delay and shaper circuit 144 delays each of these pulses from 2 circuit for a period equal to one fourth of the bit interval so that a strobe pulse is present on lead 159 and also as an input to parity check circuit 146 at the 270° point of each PSK data bit.

The output of polarity sensing amplifier is inverted for coupling to the serial data input terminal 81 of shift register 80. Following the reset pulse on terminal 141, seventeen strobe pulses will be produced on lead 159 which is coupled through OR-GATE 82 to shift input 83 of shift register 80. Each of these strobe pulses will shift into shift register 80 a data bit having a value corresponding to the inverse signal on lead 133, which is also the signal on serial data input lead 81. In other words, if a 0 signal is present on lead 81, representing a positive polarity of the PSK waveform, when a strobe pulse arrives, a 0 is shifted into the first storage unit in shift register 80. Correspondingly, if the signal on lead 81 is 1, representing a negative polarity, when the strobe pulse arrives, a 1 bit is shifted into shift register 80. Thus, the seventeen strobe pulses shift 17 bits of information into shift register 80 in accordance with the inverse polarity waveform on input lead 81. Assuming that the recovered waveform on lead 91 is a sufficiently clear representation of the recorded waveform, the final data word shifted into shift register 80 in this demodulation process will be identical to the data word written on the video tape at an earlier time.

Only 17 strobe pulses are produced on lead 159 because scaler 150 counts seventeen strobe pulses and decode-17 circuit 151 produces a 1 output on 153 after the seventeenth pulse to turn off AND-GATE 158. Thus, the 18th pulse out of delay and shaper circuit 144 goes only through AND-GATE 148 into scaler 150. Decode-18 circuit 152 then produces a 1 signal on output lead 154 to turn off AND-GATE 148 and to trigger monostable multibibrator 155. Parity check circuit 146 receives the inverted output from polarity sensing amplifier 130 and the strobe pulses and functions to provide a 0 signal on lead 147 after the eighteenth pulse from delay and shaper circuit 144 if an odd number of 1 bits have been counted by parity check circuit 146. A 0 value on lead 147 together with an output from monostable multivibrator 155 and a 0 signal from data break detector 142 on lead 143 will produce a positive signal on lead 157 during the interval following the eighteenth pulse from delay and shaper circuit 144.

The output from data break detector 142 will be 0 if, during no portion of recovered waveform, two pulses from multivibrator circuit 136 occur without a sync pulse from sync pulse generator 134. If such were to happen, data break detector 142 would produce a 1 output to indicate an irregularity in the recovered PSK waveform and the data word produced in shift register 80 would be thrown away because no output would be produced on lead 157. Correspondingly, if the output from parity check circuit 146 should be positive during the interval following the 18th pulse from delay and shaper circuit 144, AND-GATE 156 would remain off because a parity error would have been detected. The absence of a pulse on lead 157 would prevent transfer-out of erroneous data from shift register 80. However, if parity is satisfied and no data break has occurred, a transfer-out command will be received from AND-GATE 156 during the interval following the 18th pulse and data will be transferred out of shift register 80 in parallel into buffer register 40. The value 1 pulse command on lead 156 is also communicated to DAC circuit 50 to provide for a triggering signal to be produced on terminal 53 so that the analog form of the data word in buffer register 40 may be displayed on an oscilloscope.

The synchronizing bits transmitted after the parity bit will maintain synchronous operation of multivibrator circuit 136 and a series of 1's or 0's will be written into shift register 80. This extraneous operation has no effect on the data recovered since no information will be shifted out of shift register 80 until another state pulse is received and an additional seventeen bits are decoded into the shift register. When the next start pulse does occur, the data break detector 142, the 2 circuit 138, parity check circuit 146 and scaler 150 are reset, and another decoding sequence is performed.

Figure 3:
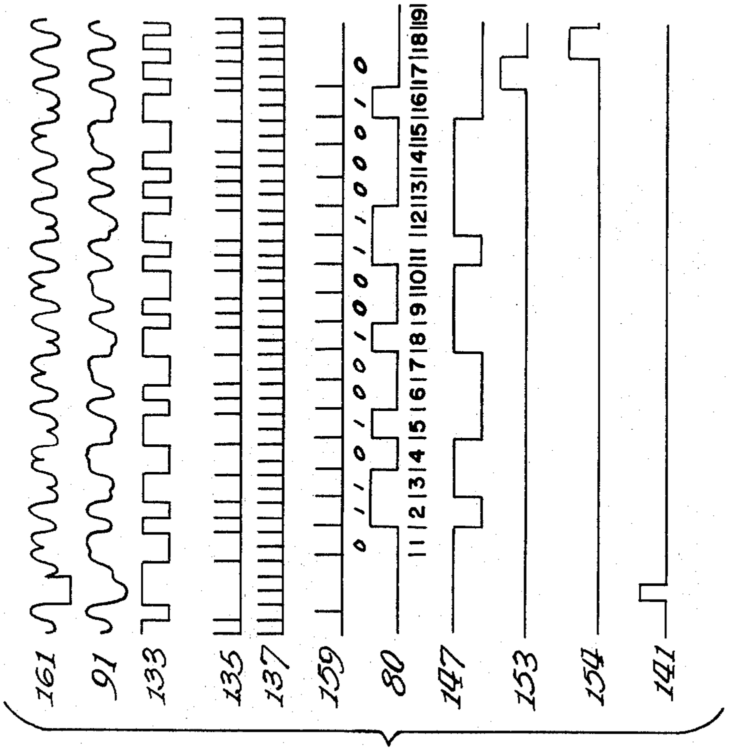
FIG. 3 is a waveform diagram illustrating the operation of the demodulation section of the data storage system.

Referring now to FIG. 3, the waveforms involved in the decoding process are shown. The waveform designated 161 is the input waveform to the video tape recorder 90, whereas waveform 91 is the type of waveform that will be recovered on lead 91 upon playback of the video tape. The characteristic loss of some portions of the shape of the recorded waveform at transition between 0 and 1 bits is illustrated. Thus, it is seen in waveform 91 that in the transition between the first and second PSK bits the recovered waveform does not return to the base line but remains positive and, correspondingly, remains negative during the transition between the third and fourth bits. The waveform 133 is the output of polarity sensing amplifier 130 in inverted form and the sync pulse waveform 135 demonstrates that sync pulses are generated each time the output of the polarity sensing amplifier changes from a 0 to 1 value and vice versa. It will also be noted that such a transition occurs at least once during each PSK bit at the 180° point so that at least one sync pulse per bit is produced by a properly recovered PSK waveform. Moreover, if this condition does not prevail during the receipt of the waveform it will be detected by data break detector 142. The output pulses from multivibrator 136 are shown as a regular series of pulses designated 137 which are synchronized by sync pulses 135. The pulses 159 are the strobe pulses which sample the inverse polarity sensing waveform 133 to produce the demodulated data bits shifted into shift register 28. It will be seen here that the recovered PSK waveform produces the same data word as that shown recorded in FIG. 2. The signal 147 is the output of parity check circuit 146, and it will be noted that, because an odd number of 1 bits have been decoded and the parity bit is a 0, the signal 147 is at a 0 value during the interval following the eighteenth pulse from delay circuit 144. The signal 153 is the decode-17 signal which prohibits further strobe pulses and the signal 154 is the decode 18 signal which triggers monostable multivibrator 155 and stops scaler 150. This same decode-18 pulse will provide the transfer-out signal to shift register 80 and also call for the production of a z' pulse by DAC circuit 50. Waveform 141 is an output from start pulse decoder 140 which resets the appropriate circuitry for a decoding sequence.

Figure 4:
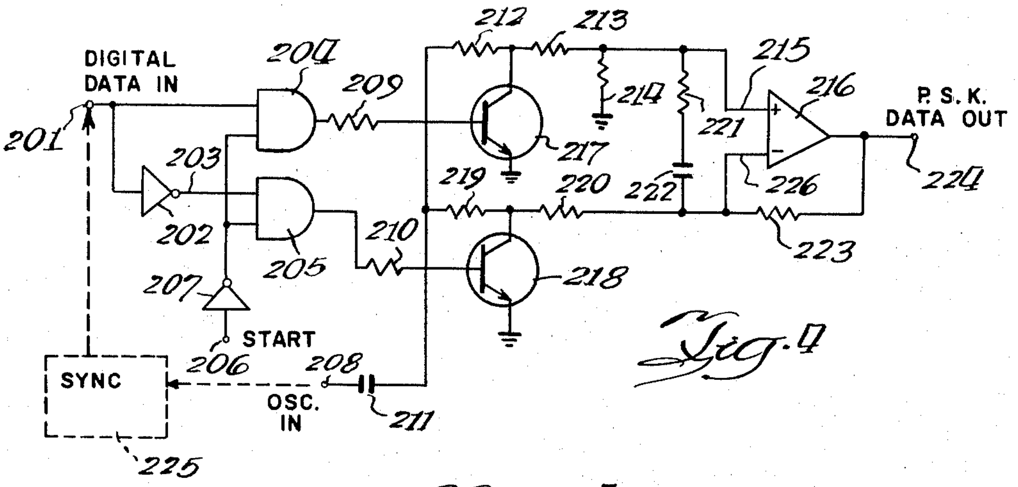
FIG. 4 is a combined circuit and block schematic diagram illustrating a preferred form of PSK modulation circuitry.
Figure 5:
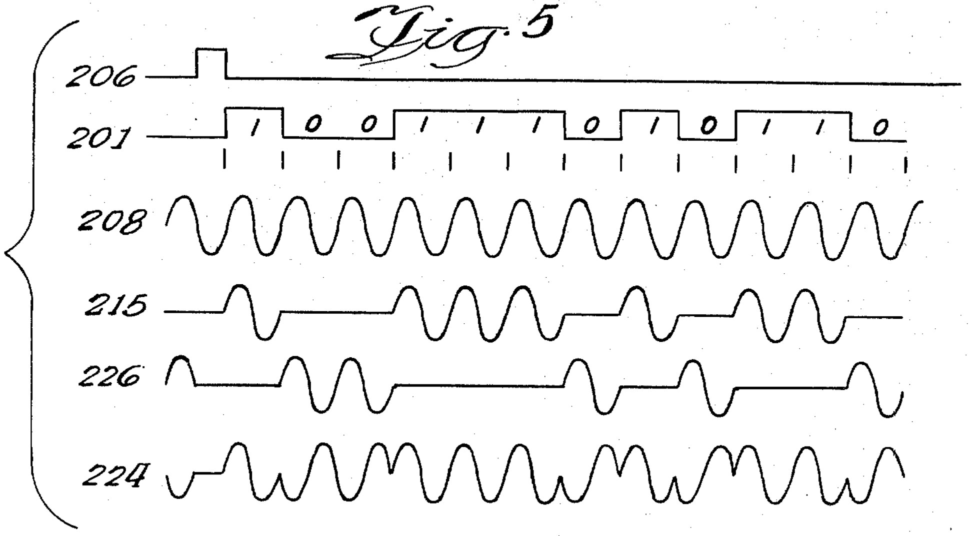
FIG. 5 is a waveform diagram illustrating the operation of the circuitry of FIG. 4.

In FIG. 4, a more general form of PSK modulation circuit is shown. The construction and operation of this circuit will be discussed in conjunction with the waveforms shown in FIG. 5. Digital data on terminal 201 is provided in synchronism with a sinusoidal waveform from an oscillator on terminal 208. The digital data waveform on terminal 201 is fed directly to an input of AND-GATE 204 and through inverting amplifier 202 to an input on AND-GATE 205. A start pulse on terminal 206 may be employed to indicate the start of a modulation sequence with the data to be modulated following the occurrence of the start pulse. AND-GATES 204 and 205 have inverted outputs and are typically called a NAND-GATES by logic circuit engineers. The inverted output from AND-GATE 204 is coupled through resistor 209 to the base of switching transistor 217 so that transistor 217 is off when AND-GATE 204 is on and correspondingly is on when AND-GATE 204 is off. Similarly, AND-GATE 205 has its inverted output coupled through resistor 210 to switching transistor 218 so that transistor 218 is off when AND-GATE 205 is on and is on when AND-GATE 205 is off.

A 1 bit on terminal 201 turns on AND-GATE 204 and turns off AND-GATE 205. Thus, during a 1 bit transistor 217 is off and transistor 218 is on. With transistor 217 off a sinusoidal waveform on input terminal 208 is coupled through capacitor 211 and resistors 212 and 213 into the positive input lead 215 of operational amplifier 216, whereas the sinusoidal waveform which is coupled through capacitor 211 and resistor 219 is shunted to ground by transistor 218. Correspondingly, for a 0 bit input on terminal 201 AND-GATE 204 is off and AND-GATE 105 is on. Thus, for a 0 bit, transistor 217 is on and transistor 218 is off so that a sinusoidal waveform will be coupled through capacitor 211 and resistors 219 220 to the — input lead 226 of operational amplifier 216. Operational amplifier 216 is connected in a difference configuration so that the output on terminal 224 is a combination of the input signals on input lead 215 with the inverse of the input signal on lead 226. From this it may be seen that an input data waveform will produce a PSK waveform on output terminal 224 with a 1 bit represented by a positive cycle of the sinusoidal waveform and a 0 bit represented by a negative cycle of the sinusoidal waveform.

Figures 6, 7:
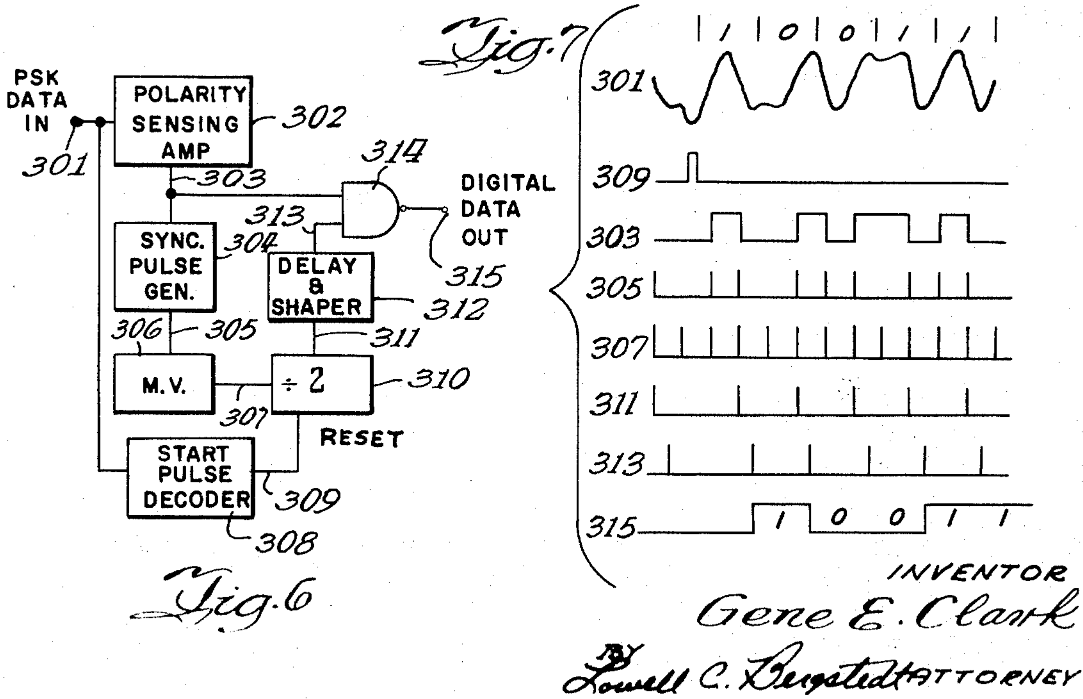
FIG. 6 is a block schematic diagram of a preferred form of demodulator circuit.
FIG. 7 is a waveform diagram illustrating the operation of the circuitry in FIG. 6.

Referring now to FIG. 6 in conjunction with FIG. 7 the general form of PSK demodulator used in the data storage system of this invention will be described. The PSK data on terminal 301 will be a sequence of PSK waveforms following a start pulse received from a recorder of some sort or from a data transmission terminal. Start pulse decoder 308 provides a reset pulse to 2 circuit 310 so that a sequence of strobe pulses 313 will be produced at the output of delay and shaper circuit 312 at the 270° point of the PSK waveform. The output on polarity sensing amplifier 302 is provided as an input to AND-GATE 314 which also receives the strobe pulses on lead 313. AND-GATE 314 has an inverted output so the signal on terminal 315 will represent the form of the input data. It should be understood that an alternate form of this demodulator circuit would be to provide an inverting amplifier between polarity sensing amplifier 302 and AND-GATE 314. In the same fashion as described above, sync pulse generator 304 provides sync pulses on lead 305 for synchronizing free-running multivibrator 306. It should be understood that in each aspect of the description above, the PSK waveform representing 0 and 1 bits could be reversed with obvious changes in the circuitry described to provide for proper outputs representing the original data waveform. The demodulator circuit in FIG. 6 could be employed in any PSK data transmission system and correspondingly the modulator circuit shown in FIG. 4 could be used in any PSK data transmission system.

It should be understood that the above descriptions of preferred embodiments of this invention are given by way of example only and numerous modifications could be made therein without department from the scope of this invention as claimed in the following claims:

I claim:

1. Apparatus for high speed, real time recording of randomly occurring binary digital data words of fixed *n* bit length comprising:
   - oscillator circuit means for producing a periodic waveform having a positive and negative half cycles with respect to a reference signal level;
   - clock circuit means receiving said periodic waveform operative to produce clock pulses defining clock intervals corresponding to a period of said waveform;
   - control means producing a transfer data in signal upon occurrence of one of said data words;
   - pulse generating means receiving said transfer data in signal and said clock pulses operative in response to a data transfer in signal to produce a data start pulse during the next succeeding clock interval and to inhibit said clock means for at least one succeeding clock interval;
   - shift register means receiving said transfer data in signal and said clock pulses operative in response to said transfer data in signal to store said data word and operative in response to *n* successive clock pulses to shift out said data word in serial form;
   - modulation means receiving said serial form of said data word and said periodic waveform operative in response to a 1 bit of said data word to produce one cycle of said periodic waveform on a first output lead and operative in response to a 0 bit of said data word to produce one cycle of said periodic waveform on a second output lead;
   - combining means receiving said data start pulse and said signals on said first and second output leads operative to produce an output waveform comprising said data start pulse followed by a combination of the signals on one of said output leads with the inverse of the signals on the other of said output leads; and
   - tape recording means for recording said output waveform.

2. Apparatus as claimed in claim 1, wherein said tape recording means is a video tape recorder, said pulse generating means includes means for producing a vertical sync pulse for said video tape recorder at a preselected repetition rate; and said combining means receives said vertical sync pulse and is operative to include said vertical sync pulse in said output waveform.

3. Apparatus for high speed, real time recording of randomly occurring binary digital data words of fixed *n* bit length on a video tape recorder system, said apparatus comprising:

oscillator circuit means for producing a sinusoidal waveform oscillating about a reference signal level;

clock circuit means receiving said sinusoidal waveform operative to produce substantially square clock pulses defining clock intervals corresponding to a period of said waveform;

control means producing a transfer-data-in signal upon occurrence of one of said data words;

pulse generating means receiving said transfer-data-in signal and said clock pulses operative in response to a transfer-data-in signal to produce a data start pulse during the next succeeding clock interval, operative to produce a vertical sync pulse at a selected reptition rate, and operative to inhibit said clock means during a data start pulse and a vertical sync pulse;

shift register means receiving said transfer-data-in signal and said clock pulses operative in response to said transfer data in signal to store said data word and operative in response to n successive clock pulses to shift out said data word in serial form;

parity generating means receiving said serial form of said data word operative to generate a parity bit in accordance with the content of said data word;

scaler-gating means operative in response to said n successive clock pulses to gate successive bits of said serial form of said data word onto a modulation input lead and operative thereafter in response to clock pulses preceeding a next successive data start pulse continuously to gate said parity bit onto said modulation input lead;

modulation means receiving said sinusoidal waveform and said bits on said modulation input lead operative in response to an input 1 bit to gate one cycle of said sinusoidal waveform onto a first output lead and operative in response to a 0 bit to gate one cycle of said sinusoidal waveform onto a second output lead; and combining means receiving said data start pulses, said vertical sync pulses, and said waveforms on said first and second output leads operative to produce an output waveform comprising said data start pulses, said vertical sync pulses and a combination of the waveforms on one of said output leads with the inverse of the waveforms on the other of said output leads; whereby said output waveform during intervals between vertical sync pulses is characteristically a data start pulse followed by *n* data bits in PSK form and one or more parity bits in PSK form until a succeeding data start pulse appears.

4. Apparatus for recovery of an original binary data word which has been recorded as a waveform comprising a data start pulse followed by *n* PSK data bits having a bit frequency of *f* bits per second with a positive cycle of a periodic waveform representing a 1 bit and a negative cycle of said periodic waveform representing a 0 bit from a recovered waveform which retains the important characteristics of the recorded waveform, said apparatus comprising:

start pulse decoding means receiving said recovered waveform operative in response to a data start pulse to produce a reset signal;

polarity sensing means receiving said recovered waveform operative in response to negative polarity portions thereof to produce a 1 output signal and operative in response to positive portions thereof to produce a 0 output signal;

strobe pulse generating means operative in response to said reset signal and recovered waveform to produce *n* strobe pulses at substantially the 270° points of each bit in said recovered waveform; and shift register means receiving said output signals from said polarity sensing means and said strobe pulses operative to store in serial form *n* bits in accordance with the values of said output signals at the occurrence of said strobe pulses, whereby said *n* bits comprise the contents of said original binary data word.

5. Apparatus as claimed in claim 4, wherein said strobe pulse generating means comprises sync pulse generating means operative to produce a sync pulse each time said output signal from said polarity sensing means changes value so that a sync pulse is produced at least at the 180° point of each PSK bit of a proper recovered waveform;

pulse generating means receiving said sync pulses operative to produce output pulses at a rate of 2f per second and responsive to said sync pulses to produce output pulses in synchronism therewith so that a series of first and second output pulses corresponding to the 0° and 180° points respectively of each PSK bit will be produced with the second output pulses synchronized;

divider means operative in response to said reset signal and said output pulses to produce a substantially 180° pulse for each second output pulse following said reset signal; and delay means for delaying said 180° pulses from said divider means for a period substantially equal to 1/(4f) to produce said strobe pulses at said 270° points.

6. Apparatus for recovery of original binary data words which have been recorded as a waveform comprising for each data word a data start pulse followed by *n* data bits, a parity bit, and a series of synchronizing bits in PSK form until another data start pulse occurs, said waveform having a bit frequency of *f* bits per second with a positive cycle of a sinusoidal waveform representing a 1 bit and a negative cycle of said sinusoidal waveform representing a 0 bit, and are replayed to produce a recovered waveform which generally retains the important characteristics of the recorded waveform, said apparatus comprising:

start pulse decoding means receiving said recovered waveform operative in response to a data start pulse to produce a reset signal;

polarity sensing means receiving said recovered waveform operative in response to negative polarity portions thereof to produce a 1 output signal and operative in response to positive portions thereof to produce a 0 output signal;

sync pulse generating means operative to produce a sync pulse each time said recovered waveform changes polarity so that a sync pulse is produced at least at the 180° point of each PSK bit of said recovered waveform;

pulse generating means synchronized by said sync pulses operative to produce output pulses at a rate of 2f per second so that a series of first and second output pulses corresponding to 0° and 180° points, respectively, of each PSK bit are produced with at least the second output pulse synchronized;

divider means operative in response to a reset signal and said output pulses to produce a 180° pulse for each second output pulse following said reset signal;

delay means for delaying said 180° pulses from said divider means to produce 270° pulses;

scaler-gating means operative in response to a reset signal and said 270° pulses to gate out the first *n* of said 270° pulses as *n* strobe pulses following a reset signal, and operative to produce a *n*+1 pulse in response to the next one of said 270° pulses to turn off said scaler-gating means;

shift register means receiving said output signals from said polarity sensing means and said strobe pulses operative to store in serial form *n* bits in accordance with the values of said output signals at the occurrence of said strobe pulses;

parity checking means receiving said output signals from said polarity sensing means and said 270° pulses operative to produce a 0 output after *n*+1 270° pulses when parity of said recovered waveform is correct and a 1 output when parity is incorrect; and trigger-gating means operative in response to said *n*+1 pulse and a 0 output from said parity checking means to produce a transfer-out signal; said shift register means including means responsive to said transfer-out signal to produce said n bits as *n* signals on parallel output lines.

7. Apparatus as claimed in claim 6, further comprising data break means receiving a reset signal, said sync pulses, and said output pulses at a 2f rate operative to inhibit said trigger-gating means upon receipt of two consecutive output pulses without a sync pulse.

8. In combination:

detector means operative to produce randomly occurring pairs of coordinate analog signals and a trigger signal in response to randomly impinging signal matter;

buffer register means operative to store a binary data word of *n* bits;

analog-to-digital conversion means operative in response to a pair of said coordinate analog signals and a trigger signal to produce a binary data word having n bits corresponding to said analog signal in said buffer register;

digital-to-analog conversion means operative in response to the *n* bit content of said buffer register to produce a pair of coordinate analog signals;

shift register means operative in response to a transfer-data-in signal to receive and store said binary data word from said buffer register, operative in response to a transfer-data-out signal to transfer a stored data word to said buffer register and operative in response to input pulses on a shift lead to shift out serially a stored data word onto a serial out lead and to shift in and store serially data bits on a serial in lead;

a video tape recorder;

control means operative to define data record and data playback modes for said recorder, to control said digital-to-analog conversion means and said analog-to-digital conversion means, and in the data record mode to supply a transfer-data-in signal to said shift register means upon availability of a data word in said buffer register means;

data writing means operative during said data record mode to transmit successive data words in said shift register to said recorder in the form of a start data pulse followed by n PSK data bits; and data reading means operative during said data playback mode to decode from a recovered waveform each of said start data pulses, to demodulate and store serially in said shift register means said n PSK data bits following each start data pulse in said recovered waveform, and to supply a transfer-data-out signal to said shift register means upon completion of said demodulation of said *n* PSK data bits.

9. The combination as claimed in claim 8, wherein said data writing means comprises:

oscillator circuit means for producing a sinusoidal waveform oscillating about a reference signal level at a frequency of *f* cycles per second;

clock circuit means receiving said sinusoidal waveform operative to produce substantially square clock pulses defining clock intervals corresponding to a period of said waveform;

pulse generating means receiving said transfer-data-in signal and said clock pulses operative in response to a transfer-data-in signal to produce a data start pulse during the next succeeding clock interval, operative to produce a vertical sync pulse at a selected repitition rate, and operative to inhibit said clock means during a data start pulse and a vertical sync pulse; said shift register means receiving said clock pulses and operative in response to *n* successive clock pulses to shift out said stored data word;

parity generating means receiving said serial form of said data word operative to generate a parity bit in accordance with the content of said data word;

scaler-gating means operative in response to said *n* successive clock pulses to gate successive bits of said serial form of said data word onto a modulation input lead and operative thereafter in response to clock pulses preceeding a next successive data start pulse continuously to gate said parity bit onto said modulation input lead;

modulation means receiving said sinusoidal waveform and said bits on said modulation input lead operative in response to an input 1 bit to gate one cycle of said sinusoidal waveform onto a first output lead and operative in response to a 0 bit to gate one cycle of said sinusoidal waveform onto a second output lead; and combining means receiving said data start pulses, said vertical sync pulses, and said waveforms on said first and second output leads operative to produce an output waveform comprising said data start pulses, said vertical sync pulses, and a combination of the waveforms on one of said output leads with the inverse of the waveforms on the other of said output leads; whereby said output waveform is characteristically a data start pulse followed by $n$ data bits in PSK form, a parity bit in PSK form, and synchronizing bits in PSK form until a succeeding data start pulse appears.

10. Apparatus as claimed in claim 9, wherein said data reading means comprises:

start pulse decoding means receiving said recovered waveform operative in response to a data start pulse to produce a reset signal;

polarity sensing means receiving said recovered waveform operative in response to negative polarity portions thereof to produce a 1 output signal and operative in response to positive portions thereof to produce a 0 output signal;

sync pulse generating means operative to produce a sync pulse each time said recovered waveform changes polarity so that a sync pulse is produced at least at the 180° point of each PSK bit of said recovered waveform;

second pulse generating means synchronized by said sync pulses operative to produce output pulses at a rate of 2f per second so that a series of first and second output pulses corresponding to 0° and 180° points, respectively, of each PSK bit are produced with at least the second output pulse synchronized;

divider means operative in response to a reset signal and said output pulses to produce a 180° pulse for each second output pulse following said reset signal;

delay means for delaying said 180° pulses from said divider means to produce 270° pulses;

second scaler-gating means operative in response to a reset signal and said 270° pulses to gate out the first $n$ of said 270° pulses following a reset signal as $n$ strobe pulses to said shift lead of said shift register means, and operative to produce a $n+1$ pulse in response to the next one of said 270° pulses to turn off said second scaler-gating means; said shift register means receiving said output signals from said polarity sensing means operative to store serially $n$ bits in accordance with the values of said output signals at the occurrence of said strobe pulses;

parity checking means receiving said output signals from said polarity sensing means and said 270° pulses operative to produce a 0 output after $n+1$ of said 270° pulses when parity of said recovered waveform is correct and a 1 output when parity is incorrect; and trigger-gating means operative in response to said $n+1$ pulse and a 0 output from said parity checking means to send a transfer-data-out signal to said shift register means, said trigger gating means inhibited by a 1 output from said parity checking means to throw away decoded data words having parity errors.

11. Apparatus for producing phase shift keyed modulation of a digital data waveform comprising:

means for producing a periodic waveform on one input terminal in synchronism with said data waveform on a second terminal so that one cycle of said periodic waveform coincides with a bit interval of said data waveform;

first and second gating means receiving said periodic signal and said data waveform and having first and second output leads associated therewith, said first gating means operative in response to a 1 bit in said data waveform to gate one cycle of said periodic waveform onto said first output lead, said second gating means operative in response to a 0 bit in said data waveform to gate one cycle of said periodic waveform generator onto said second output lead;

combining means coupled to said first and second output leads operative to combine signals on said first output lead with the inverse of signals on said second output lead to produce a PSK output waveform wherein a 1 bit is represented by a zero phase of said periodic waveform and a 0 bit is represented by a 180° phase shifted periodic waveform.

12. Apparatus as claimed in claim 11, wherein said combining means comprises an operational amplifier arranged in a difference amplifier configuration with + and − inputs, said first output lead being coupled to said + input and said second output lead being coupled to said − input.

13. Apparatus as claimed in claim 11, wherein said first and second gating means each comprise a switching transistor having an input base electrode, a grounded emitter electrode, a collector electrode coupled to said one input terminal and said output lead, and a logic gate coupled to said base electrode operative to turn off said transistor when said logic gate is on and to turn on said transistor when said logic gate is off; said switching transistor shunting said periodic waveform to ground when on and gating said periodic waveform to said output lead when off.

14. Apparatus for modulating a digital waveform in a phase shift keyed manner comprising:

means for producing a periodic waveform on a first input terminal in synchronism with said data waveform on a second terminal so that one cycle of said periodic waveform coincides with a bit interval of said data waveform and an on signal on a third terminal at the start of said data waveform;

first logic gating means coupled to said second and third terminals operative in response to said on signal and said data waveform to produce a 0 output for a 1 bit of said data waveform and a 1 output for a 0 bit of said data waveform;

second logic gating means coupled to said second and third terminals operative in response to said on signal and said data waveform to produce a 1 output for a 1 bit of said data waveform and a 0 output for a 0 bit of said data waveform;

first linear gating means coupled to said first terminal and said first logic gating means operative in response to a 0 output to gate said periodic waveform to a first output lead;

second linear gating means coupled to said first terminal and said first logic gating means operative in response to a 0 output to gate said periodic waveform to a second output lead; and combining means for adding the signals on said first output lead to the inverse of the signals on said second output lead.

15. Apparatus as claimed in claim 14, wherein said first logic gating means is a NAND gate having two inputs coupled directly to said second and third terminals; said second logic gating means comprises an inverting amplifier coupled to said second terminal, and a NAND gate having two inputs coupled directly to said inverting amplifier and said third terminal; said first and second linear gating means each comprise a switching transistor having a base electrode coupled to the output of one of said NAND gates, an emitter electrode coupled to ground reference potential, and a collector electrode coupled to said first terminal and one of said output leads; and said combining means comprises a difference amplifier having a + lead coupled to said first output lead and a − lead coupled to said second output lead.

16. Apparatus for demodulating a PSK digital waveform having a bit frequency of *f* bits per second wherein a single cycle of a sinusoidal waveform in a 0° phase represents one type of bit and a single cycle of a sinusoidal waveform in a 180° phase represents the other type of bit comprising:

polarity sensing means receiving said waveform operative in response to negative polarity portions thereof to produce a 1 output signal and operative in response to positive polarity portions thereof to produce a 0 output signal;

sync pulse generating means operative to produce a sync pulse each time said waveform changes polarity so that a sync pulse is produced at least at the 180° point of each cycle of said waveform;

pulse generating means synchronized by said sync pulses operative to produce output pulses at a rate of 2f per second so that a series of first and second output pulses corresponding to 0° and 180° points, respectively, of each bit of said waveform are produced with at least said second output pulse synchronized;

divider means receiving said first and second output pulses for producing a third output pulse corresponding to each of said second output pulses;

delay means for delaying each of said third output pulses for a time equal to 1/(4f) to produce strobe pulses at 270° points of each bit of said waveform; and binary gating means receiving said strobe pulses and said outputs from said polarity sensing means operative to produce output signals representing said one type of bit when a strobe pulse coincides with said 1 output signal and said other type of bit where a strobe pulse coincides with said 0 output signal.

17. In combination with a radiation imaging device operative in response to randomly occurring gamma ray interactions therein to produce correspondingly randomly occurring pairs of coordinate analog signals, each pair representing spatial coordinates of an associated gamma ray interaction and analog-to-digital conversion means for producing randomly occurring binary data words each having *n* bits and corresponding to one of said pairs of analog signals:

a video tape recorder including control means for selecting record and playback modes of operation of said recorder, said a wide band recording channel;

data writing means operative when said recorder is in said record mode to record said randomly occurring binary data words on said recorder in corresponding randomly occurring data word time slots, said data writing means comprising start signal means responsive to the availability of one of said binary data words to transmit to said wide band recording channel a start data signal having a duration of one data bit, and PSK modulation means for transmitting to said wide band recording channel *n* PSK data bits corresponding to said data word immediately succeeding said start data signal, said start data signal having a characteristic distinguishing from said PSK data bits; and data reading means operative when said recorder is in said playback mode to recover said binary data words, said data reading means comprising decoding means to decode said start data signal on the basis of said distinguishing characteristic and demodulating means to demodulate said *n* PSK data bits.

18. The combination as claimed in claim 17, wherein said data writing means further comprises means for transmitting a PSK parity bit to said wide band recording channel following each of said data words; and means for transmitting PSK synchronizing bits to said wide band recording channel between each PSK parity bit and a succeeding start data signal; and said data reading means further comprises a free-running clock circuit associated with said demodulating means and means responsive to each PSK bit for synchronizing said clock circuit;

means for storing n demodulated data bits; and parity checking means receiving n demodulated data bits and a demodulated parity bit operative to dump data words containing parity errors from said storing means.

* * * * *